(12) United States Patent
Hong et al.

(10) Patent No.: US 9,806,355 B2
(45) Date of Patent: *Oct. 31, 2017

(54) COMPACT DESIGN OF SOLID OXIDE FUEL CELL POWER GENERATION SYSTEM

(71) Applicant: Institute of Nuclear Energy Research, Atomic Energy Council, Executive Yuan, R.O.C., Taoyuan County (TW)

(72) Inventors: Wen-Tang Hong, Nantou County (TW); Cheng-Nan Huang, Taoyuan County (TW); Shih-Kun Lo, Taoyuan County (TW); Hsueh-I Tan, New Taipei (TW); Ching-Ha Lin, Kaohsiung (TW); Yung-Chung Shih, Kaohsiung (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 585 days.

This patent is subject to a terminal disclaimer.

(21) Appl. No.: 14/332,640

(22) Filed: Jul. 16, 2014

(65) Prior Publication Data

US 2015/0295253 A1 Oct. 15, 2015

(30) Foreign Application Priority Data

Apr. 9, 2014 (TW) .............................. 103113113 A

(51) Int. Cl.
*H01M 8/04* (2016.01)
*H01M 8/12* (2016.01)
(Continued)

(52) U.S. Cl.
CPC ......... *H01M 8/04022* (2013.01); *C01B 3/384* (2013.01); *H01M 8/04014* (2013.01); *H01M 8/04738* (2013.01); *H01M 8/0618* (2013.01); *H01M 8/0631* (2013.01); *H01M 8/12* (2013.01); *H01M 8/243* (2013.01); *H01M 8/2485* (2013.01); *C01B 2203/0227* (2013.01); *C01B 2203/0244* (2013.01);
(Continued)

(58) Field of Classification Search
None
See application file for complete search history.

(56) References Cited

U.S. PATENT DOCUMENTS

| 6,749,958 B2 * | 6/2004 | Pastula ...................... C01B 3/38 429/423 |
| 9,419,296 B2 * | 8/2016 | Hong ...................... C01B 3/384 |
| 2013/0101912 A1 * | 4/2013 | Hong ...................... C01B 3/384 429/423 |

* cited by examiner

*Primary Examiner* — Barbara Gilliam
*Assistant Examiner* — Adam A Arciero
(74) *Attorney, Agent, or Firm* — Jackson IPG PLLC; Demian K. Jackson

(57) ABSTRACT

An apparatus of power generation is provided. The apparatus uses a stack of dense solid oxide fuel cells (SOFC). The exhaust gas generated by a burner of the apparatus enters into the SOFC stack for heating. At the same time, the SOFC stack is heated by the thermal radiation and heat transfer of the burner as well as the thermal convection of gases between the anode and the cathode. Thus, the SOFC stack is heated to reach an operating temperature for generating power without any additional electroheat device. The present invention has a simple structure, flexible operation. Moreover, it increased efficiency, reduced pollutant emission with lowered costs of equipment and operation.

8 Claims, 7 Drawing Sheets

(51) Int. Cl.
  *H01M 8/06*      (2016.01)
  *H01M 8/04014*   (2016.01)
  *H01M 8/0612*    (2016.01)
  *H01M 8/243*     (2016.01)
  *H01M 8/2485*    (2016.01)
  *H01M 8/04701*   (2016.01)
  *C01B 3/38*      (2006.01)
  *H01M 8/124*     (2016.01)

(52) U.S. Cl.
  CPC . *C01B 2203/066* (2013.01); *C01B 2203/0811* (2013.01); *H01M 2008/1293* (2013.01); *H01M 2300/0074* (2013.01); *Y02P 20/129* (2015.11)

COMPACT DESIGN OF SOLID OXIDE FUEL CELL POWER GENERATION SYSTEM

TECHNICAL FIELD OF THE INVENTION

The present invention relates to solid oxide fuel cell (SOFC); more particularly, relates to heating an SOFC stack by using heat of exhaust gas generated from a burner, heat radiation and conduction of the burner, and thermal convection between anode and cathode gases. For reaching an operating temperature to generate power without any additional electric devices, where the present invention has a simple structure, flexible operation, moreover, it increased efficiency, reduced pollutant emission with lowered costs of equipment and operation.

DESCRIPTION OF THE RELATED ART

The progress of technology does drive economic growth; but a large number of fossil energy consumption makes the resilience of the natural environment weak. The consequences include environmental pollutions, exhausted resources and threatened human future. Among these, the worsening global warming issue catches the most attention, which follows with depletion problems of energy sources like oil, gas, coal, etc.

How to reduce carbon dioxide and other greenhouse gas emissions becomes a daunting task. For solving the problem, the development of new energies and related technologies is imminent. Among a variety of new power generation technologies, wind power is limited by the environmental characteristics; photoelectric conversion efficiency of solar energy should be strengthened; the technology of generating power by using temperature difference between ocean tides is not yet mature; and the use of geothermal resources for power generation is limited. These techniques are not suitable for large-scale use in all countries.

Fuel cell has many advantages, like low pollution, low noise, high efficiency and wide application. In recent years, it has become the most competing and promoting technology. Fuel cell is not like the conventional battery which generally only serves as a storage unit nor like the internal combustion engine which functions through the heat generated by burning fuel only. Fuel cell uses the principle of electrochemical, where the chemical energy of fuel is transformed into electrical energy for releasing heat. The fuel used in various types of fuel cells is mainly hydrogen. An electrolyte of solid material is used in SOFC, where only reactions between two phases of solid and gas are involved. Therefore, SOFC does not have the problem on electrolyte management, which simplifies its design. SOFC has to be operated at high temperature, which results in high efficiency and high-quality heat accompanied. By using gas-turbine for re-generating power, SOFC has advantage over the other fuel cells.

Because hydrogen cannot exist alone in nature, hydrogen generation appears to be quite important in the development of hydrogen energy systems, where hydrogen is generated for a variety of fuel cells. In order to generate a lot of hydrogen required, raw materials like methane, methanol, ethanol, natural gas, liquefied petroleum gas, gasoline, etc., can produce hydrogen after high-temperature reformation. Hence, with a reformer, the fuels are reformed into hydrogen-rich gases of high temperatures. According to energies required by their different reformation methods, the reformer may use electric heating. But, the equipments required for electric heating may be massive and power consuming. Therefore, the fuel cell power generation system generally begins with a burner for recycling residual fuel obtained after electrochemical reactions in the cell stack to process combustion reaction for increasing heat energy of the high-temperature exhaust gas. Meanwhile, the heat energy is provided to the reformer for the fuel reformation reaction for improving the overall efficiency of the system. The operation temperatures for SOFCs are mostly more than 800° C. Therefore, the inlet temperatures at anode and cathode have to be more than 700° C., where the gas of anode meets the requirement for its temperature reaches more than 700° C. after fuel reformation; yet, the air at cathode needs to use a number of heat exchangers to be heated up to more than 700° C.

During the process of rising the temperature, since the cell stack of the SOFC power generation system has to bond metal and ceramic, the cell stack may be ruined if the heating rate becomes too fast or the temperature difference between anode and cathode is too big. Hence, electric heating is generally used in the SOFC generation system for heating the system and reheating the anode and cathode air/gas inlets. Nevertheless, the system structure becomes more large, complex and expensive and big heat loss happens.

As is mentioned, the SOFC power generation system uses a hydrogen-rich gas to process an electrochemical reaction for generating power. Therein, the residual fuel not-yet processed through the electrochemical reaction is directed into the burner for combustion reaction to increase heat energy of the exhaust gas. The heat energy is provided to the reformer for fuel reformation reaction for improving the overall efficiency of the system. However, in general, the reformer are operated at a temperature more than 700° C. If the burner and reformer have separate independent designs, the burner will be inevitably connected to the reformer through pipeline, which is a problem hard to solve on providing a holding device under high temperature. For solving the problem of heat loss, the operating temperature of the burner sometimes takes up to 1000° C. or more in order to provide sufficient energy to the reformer for fuel reformation. As a result, not only the heat loss becomes great, but also the system efficiency is not enhanced. Besides, as long as the burner is operated at very high temperature for a long time, the system may be burned up and in risk on operation. Furthermore, the air required at the cathode of the SOFC system has to be heated up to more than 700° C. by using a number of heat exchanger. Therefore, if the burner, the reformer and the heat exchanger required by the SOFC system are not integrated, the convergence of pipelines will be more complex. Not only the construction is not easy but also the system will not be compact and concise, which results in a huge and complex system not capable of improving its overall efficiency by decreasing heat loss.

A prior art, Patent WO 2013/114776 A1, is revealed, where a burner, a reformer and heat exchangers are integrated. However, its gases of anode and cathode enter into a cell stack without using a buffer device and no heat exchange is provided according to the temperatures at anode and cathode. Consequently, the cell stack may be ruined if the heating rate becomes too fast or the temperature difference between anode and cathode is too big.

Hence, the prior arts do not fulfill all users' requests on actual use.

SUMMARY OF THE INVENTION

The main purpose of the present invention relates to solid oxide fuel cell (SOFC); more particularly, relates to heating an SOFC stack by using heat of exhaust gas generated from a burner, heat radiation and conduction of the burner, and thermal convection between anode and cathode gases. For reaching an operating temperature to generate power without any additional electric devices, where the present invention has a simple structure, flexible operation, moreover, it increased efficiency, reduced pollutant emission with lowered costs of equipment and operation.

To achieve the above purpose, the present invention is an apparatus of power generation using dense SOFCs, comprising (a) an integrated thermal device, which comprises (a1) a burner; (a2) an igniter activating the burner; (a3) a reformer covering the burner at outside; (a4) an air preheater covering the reformer at outside; and (a5) a hot air outlet unit covering the air preheater at outside; (b) a distributing unit connected with the reformer, the air preheater and the hot air outlet unit; (c) an SOFC stack connected with the distributing unit; (d) a heat exchanger connected with the burner; and (e) a holding furnace covering the integrated thermal device, the distributing unit and the SOFC stack. Accordingly, a novel apparatus of power generation using dense SOFCs is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the preferred embodiment according to the present invention;

DESCRIPTION OF THE PREFERRED EMBODIMENT

The following description of the preferred embodiment is provided to understand the features and the structures of the present invention.

Figure 1:
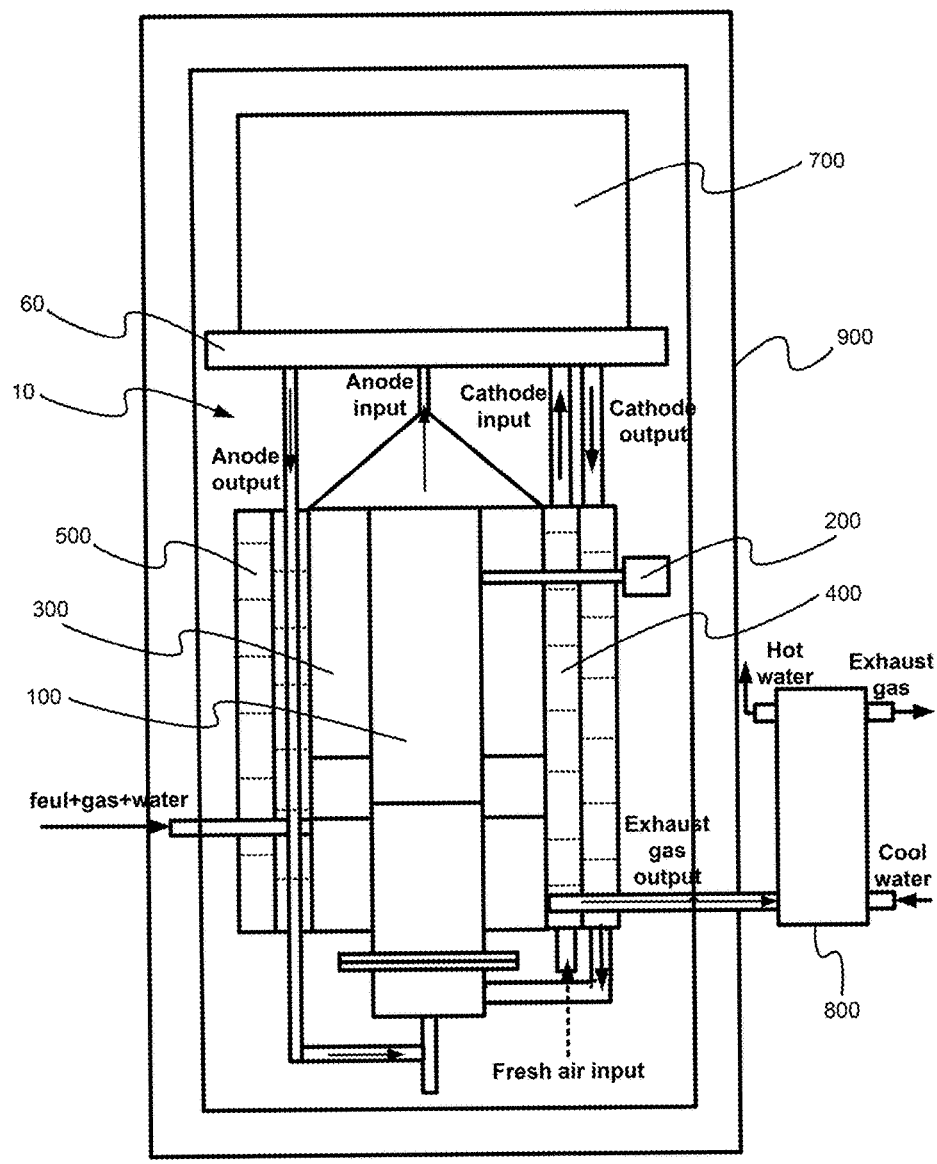

Please refer to FIG. 1 to FIG. 7, which are a structural view showing a preferred embodiment according to the present invention; views showing an integrated thermal device, an injecting device, a distributing ring and a diffusion plate; and views showing an assembled and disassembled distributing unit. As shown in the figures, the present invention is an apparatus of power generation using dense solid oxide fuel cells (SOFC), comprising an integrated thermal device 10, a distributing unit 60, an SOFC stack 700, a heat exchanger 800 and a holding furnace 900. Therein, a hydrogen-rich reformed gas is generated and air at cathode is heated; the gas and the air separately enter into the distributing unit 60 for distributing flows and exchanging heat between gases of anode and cathode; then, the distributed gas and air enter into the anode and cathode of the SOFC stack 700 to generate power through electrochemical reactions; and, at last, heat of exhaust gas is recycled at an gas outlet by the heat exchanger 800. Thus, residual heat of the SOFC stack 700 is fully used, while the apparatus is coated with the holding furnace 900 made of an insulation material having low thermal conductivity for reducing heat dissipation and improving performance (as shown in FIG. 1).

Figure 2:
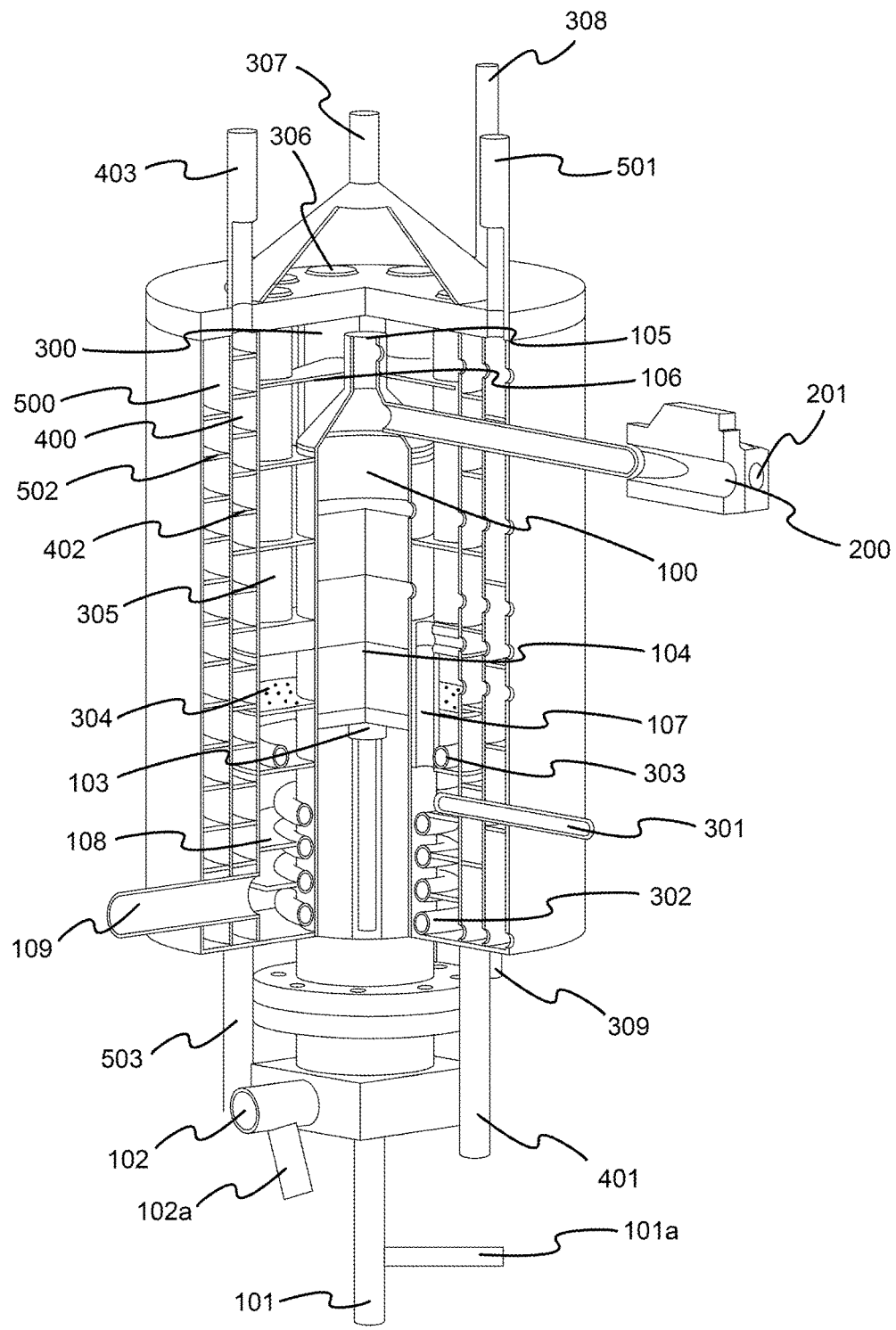
FIG. 2 is the view showing the integrated thermal device.
Figure 3:
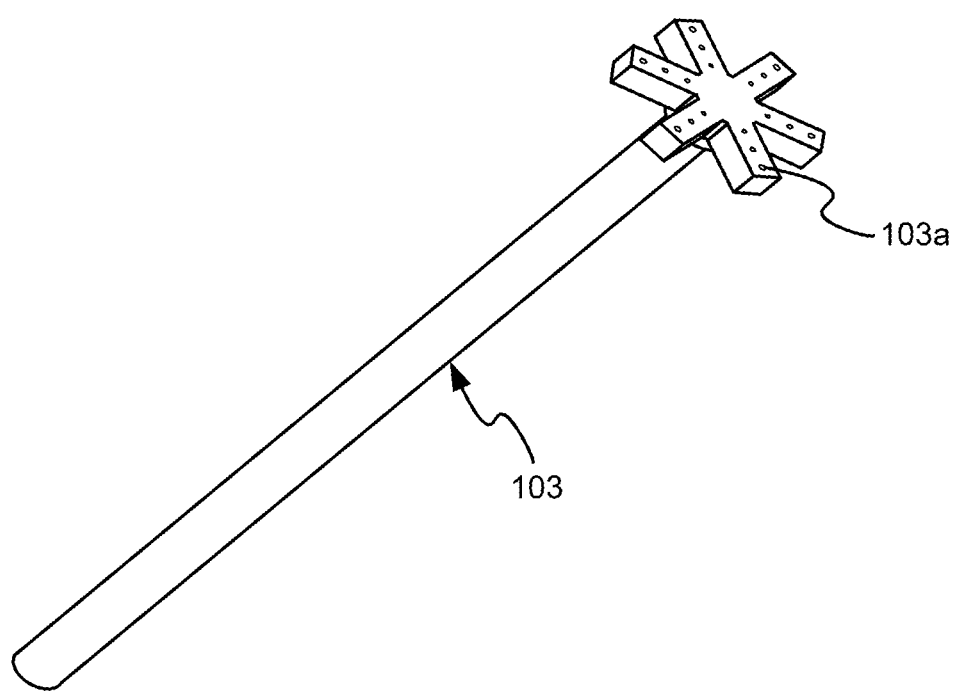
FIG. 3 is the view showing the injecting device.
Figure 4:
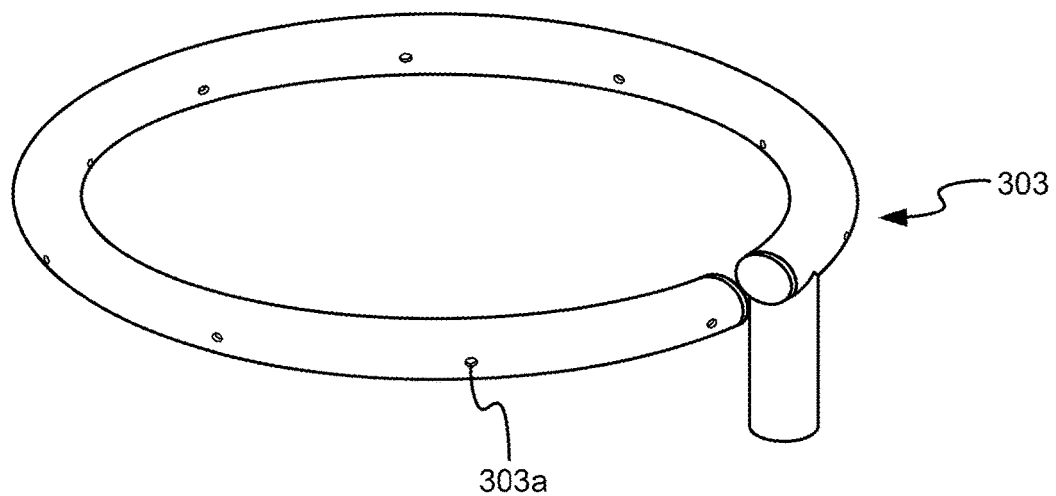
FIG. 4 is the view showing the distributing ring.
Figure 5:
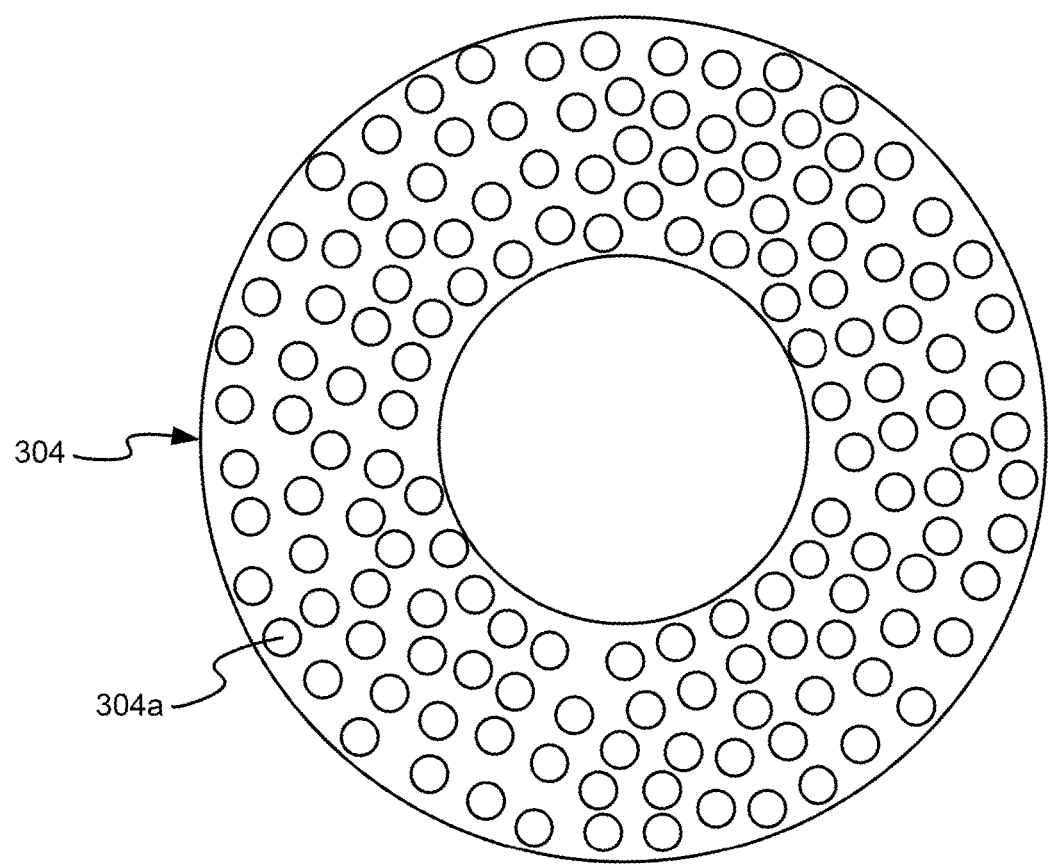
FIG. 5 is the view showing the diffusion plate.

The integrated thermal device 10 (shown in FIG. 1 and FIG. 2) comprises a burner 100; an igniter 200 activating the burner 100; a reformer 300 coating the burner 100 at outside; an air preheater 400 coating on the reformer 300 at outside; and a hot air outlet unit 500 coating on the air preheater 400 at outside, where the burner 100 comprises an injection device 103; a natural gas inlet 101 connected with the injecting device 103; a residual fuel inlet 101a connected with the natural gas inlet 101; an oxidant inlet 102 connected with the injecting device 103; a porous medium 104 set on the injecting device 103; a combusted gas outlet 105 connected with the porous medium 104; an exhaust gas gill 106 connected after the exhaust gas outlet 105; a guiding channel 107 set on the injecting device 103 at outside; a guiding vane 108 set on the injecting device 103 at outside; and an exhaust gas outlet 109 connected with the guiding vane 108. The injecting device 103 (as shown in FIG. 3) injects fuel on the porous medium 104 through injecting holes 103a for processing a burning reaction in the burner 200 with air entered from the oxidant inlet 102 or a residual air inlet 1012a; the igniter 200 has a natural-gas and air inlet 201. The reformer 300 comprises a fuel inlet 301 introducing a fuel; a preheating tube 302 preheating the fuel; a distributing ring 303 distributing the fuel; a diffusion plate 304 diffusing the fuel; a fuel reformer 305 reforming the fuel; a plurality of reformer outlets 306; a reformed gas outlet 307; a first anode gas outlet 308; and a gas tube outlet 309. The distributing ring 303 (as shown in FIG. 2 and FIG. 4) distributes the preheated fuel through distributing ring outlets 303a so that the fuel is evenly distributed into the diffusion plate 304. After the fuel is evenly distributed into the diffusion plate 304 (as shown in FIG. 2 and FIG. 5) through the distributing ring outlet 303a, the fuel enters into the fuel reformer 305 through the diffusion holes 304a for processing a reforming reaction. The air preheater 400 comprises a cathode air inlet 401, a plurality of air gills 402 and a preheated air outlet 403. The hot air outlet unit 500 comprises a hot air inlet 501, a plurality of hot air gills 502, and a cooled air outlet 503. The integrated thermal device 10 is formed by integrating the burner 100, the reformer 300, the air preheater 400 and the hot air outlet unit 500 into a single unit, where the burner 100 is the innermost layer, the second layer 300 is the reformer 300, the third layer is the air preheater 400 and the outermost layer is the hot air outlet unit 500. Because there are no pipelines connecting the layers, it is easy for the layers to be assembled with the SOFC stack 700 to form an SOFC power generator. Thus, the SOFC power generator is more compact and concise; size of the generator is effectively reduced; heat loss is further lowered; and overall performance is improved. Therein, the reformer 300 covers the burner 100; simultaneously, absorbs heat of high-temperature air generated after the burning reaction in the burner 200; and absorbs heat obtained from thermal radiation and heat transfer of the burner 200. Not only surface temperature is lowered; but also heat dissipation between the reformer 300 and the burner 100 is reduced for there are no connecting pipelines between them. Besides, the operating temperature of the burner 200 is lowered for reducing operation risk. The air preheater 400 is used for heating the air required by a cathode electrode of the SOFC stack 700. When fresh air enters into the air preheater 400, the air absorbs heat of a high-temperature exhaust gas from the burner 100 and heat of high-temperature air from cathode outlet, so that the air is pre-heated to a temperature required by the cathode of the SOFC stack 700. Then, the air is processed through an electrochemical reaction with a hydrogen-rich gas of anode in the SOFC stack 700, where air at the cathode further absorbs heat in the SOFC stack 700 to heighten the temperature; then, the air enters into the hot air outlet unit 500 to provide heat to the air preheater 400 for preheating fresh air and cooling down temperature; and, then, the cooled air at the cathode outlet enters into the burner 100 for processing a burning reaction at the porous medium 104 with residual fuel of anode. Because the burner 100 of the integrated thermal device 10 uses porous medium without remixing fuels, hydrogen temper is avoided and, when fuel amount is located at a lean level, flame is not easily turned off. As a result, the whole apparatus can be operated stably.

Figure 6:
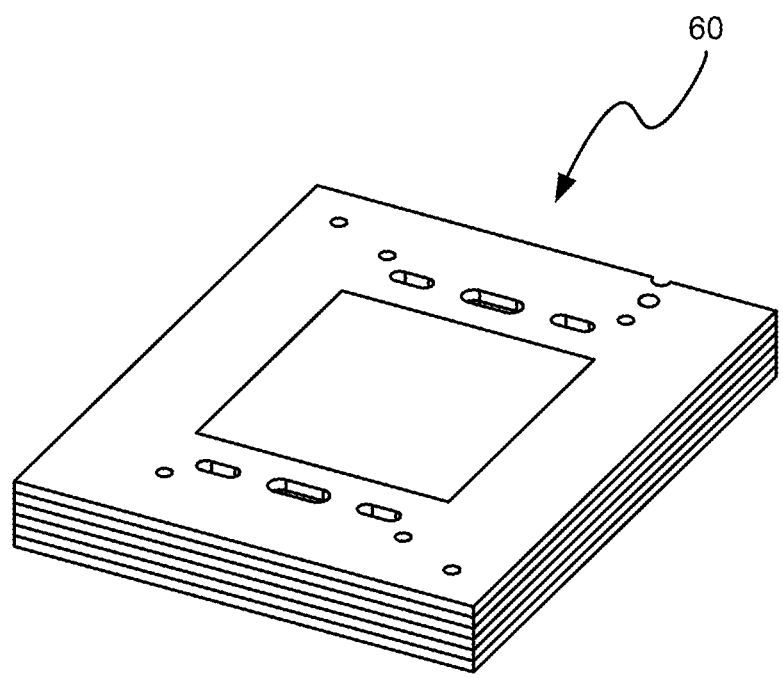
FIG. 6 is the view showing the assembled distributing unit.
Figure 7:
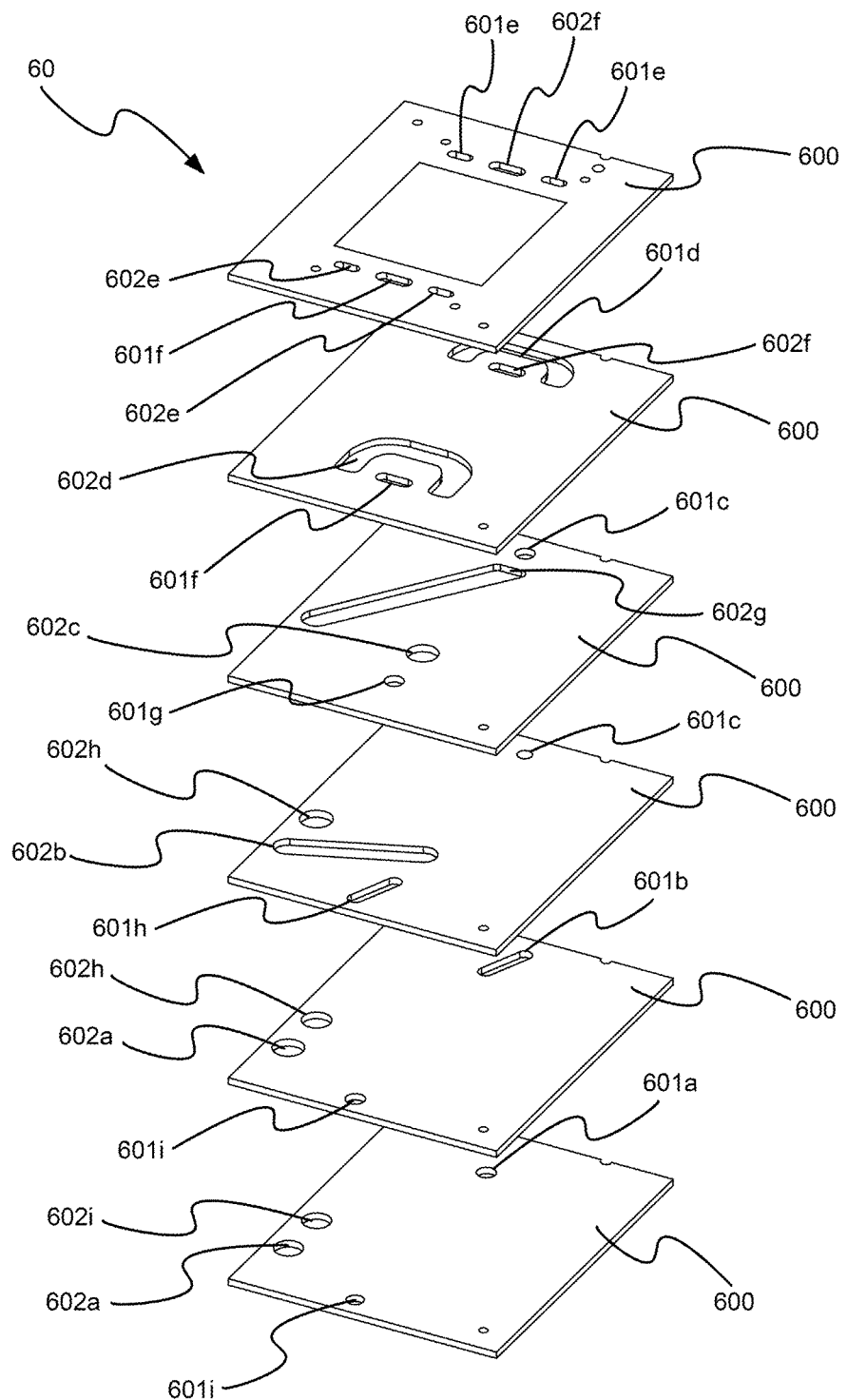
FIG. 7 is the view showing the disassembled distributing unit.

The distributing unit 60 (as shown in FIG. 6 and FIG. 7) is connected with the reformer 300, the air preheater 400 and the hot air outlet unit 500, where the distributing unit 60 comprises a stack of distributing plates 600 and the distributing plates 600 have a first anode gas inlet 601a; a first inlet diversion channel 601b; a first inlet diversion hole 601c; a first distributing channel 601d; two second anode gas inlets 601e; a second anode gas outlet 601f; a first outlet diversion hole 601g; a first outlet diversion channel 601h; a third anode gas outlet 601i; a first cathode gas inlet 602a; a second inlet diversion channel 602b; a second inlet diversion hole 602c; a second distributing channel 602d; two second cathode gas inlets 602e; a first cathode gas outlet 602f; a second outlet diversion channel 602g; a second outlet diversion hole 602h; and a second cathode gas outlet 602i.

The distributing unit 60 not only reduces manifolds of airflow inlet and outlet while effectively distributing airflow to enter into the anode and cathode of the SOFC stack 700; but also buffers temperatures of the gases of the anode and cathode on entering into the SOFC stack 700 and processes heat exchange between the gases of the anode and cathode. Thus, the SOFC stack is avoided from corruption owing to too fast temperature-rising or too big temperature difference between the gases of the anode and cathode.

The SOFC stack 700 is connected with the distributing unit 60, where the reformed gas of the anode is processed through an electrochemical reaction with the air of the cathode to generate power and release heat.

The heat exchanger 800 is connected with the burner 100, where the heat exchanger 800 recycles heat of the exhaust gas of the apparatus to improve overall efficiency.

The holding furnace 900 is coated on the integrated thermal device 10, the distributing unit 60 and the SOFC stack 700. The holding furnace 900 is made of an insulation material having low thermal conductivity to coat the power generator for improve the overall efficiency of the power generator by reducing heat dissipation.

On using the present invention, there are two phases: The first one is a heating process to heat up the apparatus with the high-temperature flows of the anode diluted gas and the cathode air for achieving an ambient temperature to output a maximum power of the SOFC stack 700. The second phase is to convert the diluted gas to a hydrogen-rich reformed gas for generating power.

At first, the igniter 200 ignites the burner 100; and, then, a natural gas enters into the gas inlet 101. Through the injecting device 103, the natural gas is mixed with the air from the oxidant inlet 102 to be burned in the porous media 104. A high-temperature exhaust gas thus generated after the burning goes through the exhaust gas outlet 105 to enter into the exhaust gas gill 106, where heat is provided for raising temperature of the diluted gas in the fuel reformer 305.

Then, the high-temperature exhaust gas goes around the diffusion plate 304 and the distributing ring 303 through the guiding channel 107 and then enters into the guiding vane 108 to provide heat for pre-heating the diluted gas. At last, the high-temperature exhaust gas can be exhausted from the heat exchanger 800 through the exhaust gas outlet 109 to absorb residual heat for fully using heat of the exhaust gas. When the diluted gas enters into the reformer 300 for heating, the diluted gas (typically $H_2$ and $N_2$) enters into the preheating tube 302 through the fuel inlet 301 to be preheated by absorbing the heat of the high-temperature exhaust gas, at first. Then, the diluted gas enters into the distributing ring 303 to be uniformly sprayed from the distributing ring 303. Through the diffusion plate 304, the diluted gas is uniformly diffused. The diluted gas enters into the fuel reformer 305 again to absorb a lot of heat of the high-temperature exhaust gas for raising temperature. At last, through the reformer outlet 306 and the reformed gas outlet 307, the high-temperature diluted gas enters into the anode of the SOFC stack 700. Therein, the diluted gas sequentially enters into the first anode gas inlet 601a, the first inlet diversion channel 601b, the first inlet diversion hole 601c, the first distributing channel 601d, the second anode gas inlet 601e, the second anode gas outlet 601f, the first outlet diversion hole 601g, the first outlet diversion channel 601h and the third anode gas outlet 601i of the distributing plate 600. At the moment, the diluted gas of the anode is only heated up but is not processed through any electrochemical reaction. Then, the diluted gas enters into the air preheater 400 through the first anode gas outlet 308 of the SOFC stack 700 to be directed back to the residual fuel inlet 101a through the gas tube outlet 309 of the SOFC stack 700. The diluted gas enters into the burner 100 through the injecting device 103 for combustion. Therein, a proper amount of natural gas is added through the natural gas inlet 101 for maintaining the temperature of the porous medium 104 of the burner 100.

The air required for the cathode of the SOFC stack 700 is introduced through the fresh air inlet 401 to enter into the air preheater 400, at first. Through the air gill 402, the air gradually absorbs heat of the high-temperature exhaust gas obtained from the burner 100 to raise its temperature. Through the preheated air outlet 403, the high-temperature air enters into the cathode of the SOFC stack 700. Therein, the air sequentially enters into the first cathode gas inlet 602a, the second inlet diversion channel 602b, the second inlet diversion hole 602c, the second distributing channel 602d, the second cathode gas inlet 602e, the first cathode gas outlet 602f, the second outlet diversion channel 602g, the second outlet diversion hole 602h and the second cathode gas outlet 602i of the distributing plate 600. At the moment, the air at the cathode heats up the SOFC stack 700 only. Through the hot air inlet 501, the air enters into the hot air outlet unit 500 to be directed through the hot air gill 502 to enter into the cooled air outlet 503. As the cooled air outlet 503 is connected to the residual air inlet 102a, the air enters into the burner 100 again for combustion in the porous medium 104 of the burner 100 with the diluted gas of the anode. At the moment, a proper amount of air is added through the oxidant inlet 102 for controlling the temperature of the porous medium 104 of the burner 100.

When the diluted gas of the anode and the high-temperature air flow of the cathode are used for heating up to reach an ambient temperature required for outputting power, the second phase is processed: The diluted gas of the anode is gradually converted to a hydrogen-rich reformed gas. The conversion process is to gradually reduce the diluted gas while gradually increase the reformed gas. After the diluted gas is completely replaced by the reformed gas, the SOFC stack 700 starts to output power. During the conversion, cooled-air or fuel is added to control the temperature of the gases of the anode and the cathode for maintaining the ambient temperature of the SOFC stack 700.

The hydrogen-rich reformed gas is generated by processing a fuel reformation reaction with the reformer 300 of the integrated thermal device 10.

At first, the fuel (usually natural gas, air and water, which change according to the fuel to be reformed and the method used) enters into the preheated tube 302 through the fuel inlet 301 to absorb heat of the high-temperature exhaust gas for preheating the fuel. The fuel enters into the distributing ring 303 for being uniformly spayed out from the distributing ring 303. The fuel is evenly spread through the diffusion plate 304. The fuel enters into the fuel reformer 305, where the fuel absorbs a great amount of heat energy of the high-temperature exhaust gas through a catalyst for processing the fuel reformation reaction to produce the hydrogen-rich gas. At last, the reformed gas thus produced enters into the anode of the SOFC stack 700 through the reformer outlet 306 and the reformed gas outlet 307, where the reformed gas sequentially enters into the first anode gas inlet 601*a*, the first inlet diversion channel 601*b*, the first inlet diversion hole 601*c*, the first distributing channel 601*d*, the second anode gas inlet 601*e*, the second anode gas outlet 601*f*, the first outlet diversion hole 601*g*, the first outlet diversion channel 601*h* and the third anode gas outlet 601*i* of the distributing plate 600. During the process, the hydrogen-rich reformed gas is reacted with the oxidant of the cathode for generating power. The un-reacted residual hydrogen-rich gas enters into the air preheater 400 through the first anode gas outlet 308 of the SOFC stack 700 to provide a part of heat for preheating the air of cathode. Then, the gas is directed to the residual fuel inlet 101*a* through the gas tube outlet 309 to enter the burner 100 through the injecting device 103 for processing a combustion reaction. Therein, during the process of gradually converting the diluted gas into the hydrogen-rich reformed gas of the anode, the air of the cathode keeps the same without any change.

To sum up, the present invention is an apparatus of power generation using dense SOFCs, where exhaust heat generated from the burner enters into the SOFC stack for heating and the burner's heat radiation, thermal conduction and heat convection between gases of anode and cathode are used for heating the SOFC stack as well for reaching an operating temperature to output power without any additional electric devices; and the present invention has a simple structure, flexible operation, increase system efficiency, reduced pollutant emission and lowered costs of equipment and operation.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of power generation using dense solid oxide fuel cells (SOFC), comprising:
   (a) an integrated thermal device, comprising:
   (a1) a burner;
   (a2) an igniter, said igniter activating said burner;
   (a3) a reformer, said reformer coating an outer surface of said burner;
   (a4) an air preheater, said air preheater coating an outer surface of said reformer; and
   (a5) a hot air outlet unit, said hot air outlet unit coating an outer surface of said air preheater;
   (b) a distributing unit, said distributing unit being connected with said reformer, said air preheater and said hot air outlet unit;
   (c) a SOFC stack, said SOFC stack being connected with said distributing unit;
   (d) a heat exchanger, said heat exchanger being connected with said burner; and
   (e) a holding furnace, said holding furnace coating said integrated thermal device, said distributing unit and said SOFC stack.

2. The apparatus according to claim 1,
   wherein said burner comprises
   an injecting device;
   a natural gas inlet, said natural gas inlet being connected with said injecting device;
   a residual fuel inlet, said residual fuel inlet being connected with said natural gas inlet;
   an oxidant inlet, said oxidant inlet being connected with said injecting device;
   a porous medium, said porous medium being located on said injecting device;
   a combusted gas outlet, said combusted gas outlet being connected after said porous medium;
   an exhaust gas gill, said exhaust gas gill being connected after said porous medium;
   a guiding channel, said guiding channel being located on an outer surface of said injecting device;
   a guiding vane, said guiding vane extending around said outer surface of said injecting device; and
   an exhaust gas outlet, said exhaust gas outlet being connected with said guiding vane.

3. The apparatus according to claim 1,
   wherein said igniter has a natural-gas and air inlet.

4. The apparatus according to claim 1,
   wherein said reformer comprises
   a fuel inlet, said fuel inlet introducing a fuel;
   a preheating tube, said preheating tube preheating said fuel;
   a distributing ring, said distributing ring distributing said fuel;
   a diffusion plate, said diffusion plate diffusing said fuel;
   a fuel reformer, said fuel reformer reforming said fuel;
   a plurality of reformer outlets;
   a reformed gas outlet;
   a first anode gas outlet; and
   a gas tube outlet.

5. The apparatus according to claim 1,
   wherein said air preheater comprises
   a cathode air inlet;
   a plurality of air gills; and
   a preheated air outlet.

6. The apparatus according to claim 1,
   wherein said hot air outlet unit comprises
   a hot air inlet;
   a plurality of hot air gills; and
   a cooled air outlet.

7. The apparatus according to claim 1,
   wherein said distributing unit comprises a stack of distributing plates and said distributing plates have
   a first anode gas inlet;
   a first inlet diversion channel;
   a first inlet diversion hole;
   a first distributing channel;

two second anode gas inlets;
a second anode gas outlet;
a first outlet diversion hole;
a first outlet diversion channel;
a third anode gas outlet;
a first cathode gas inlet;
a second inlet diversion channel;
a second inlet diversion hole;
a second distributing channel;
two second cathode gas inlets;
a first cathode gas outlet;
a second outlet diversion channel;
a second outlet diversion hole; and
a second cathode gas outlet.

8. The apparatus according to claim 1, wherein said holding furnace is made of an insulation material having low thermal conductivity.

* * * * *